US006971492B1

(12) United States Patent
Steckling

(10) Patent No.: US 6,971,492 B1
(45) Date of Patent: Dec. 6, 2005

(54) SHOCK ADAPTER

(76) Inventor: Joseph M. Steckling, 915 2nd St. North, Sauk Rapids, MN (US) 56379

( * ) Notice: Subject to any disclaimer, the term of this patent is extended or adjusted under 35 U.S.C. 154(b) by 0 days.

(21) Appl. No.: 10/692,197

(22) Filed: Oct. 23, 2003

(51) Int. Cl.[7] ................................ F16F 5/00
(52) U.S. Cl. ................ 188/312; 188/300; 267/120
(58) Field of Search ............... 188/300, 312; 267/64.12, 120, 124; 213/8, 43, 45

(56) References Cited

U.S. PATENT DOCUMENTS

| 3,361,269 | A | * | 1/1968 | Peterson | 213/8 |
|---|---|---|---|---|---|
| 3,731,914 | A | * | 5/1973 | Cope et al. | 267/64.13 |
| 4,591,031 | A | * | 5/1986 | Kirst | 188/287 |
| 4,779,845 | A | * | 10/1988 | Bartesch et al. | 267/120 |
| 5,323,884 | A | * | 6/1994 | Machino | 188/312 |
| 5,480,128 | A | * | 1/1996 | Cotter | 267/64.11 |
| 5,746,335 | A | * | 5/1998 | Brough et al. | 213/43 |
| 5,984,058 | A | * | 11/1999 | Danneker | 188/312 |
| 6,062,352 | A | * | 5/2000 | Shinozaki et al. | 188/322.16 |

* cited by examiner

Primary Examiner—Christopher P. Schwartz
(74) Attorney, Agent, or Firm—Jacobson and Johnson

(57) ABSTRACT

A shock adapter for converting a one-way shock absorber into a two-way shock absorber comprising a housing having a first slideable member located on one end and a second slideable member located on the opposite end with the housing having a chamber therein for receiving and supporting a one-way shock absorber in a condition that allows movement of the housing of the one-way shock absorber in one direction when subject to a first force and the movement of the slideable member of the one-way shock absorber when subject to a second force in a direction opposite to the first force.

2 Claims, 2 Drawing Sheets

SHOCK ADAPTER

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

FIELD OF THE INVENTION

This invention relates generally to shock adapters and, more specifically, to a shock adapter that converts a one-way shock absorber into a two-way shock absorber.

BACKGROUND OF THE INVENTION

The concept of shock absorbers that are placed on equipment such as carts or other apparatus to absorb impacts are known in the art. Generally, shock absorbers include a housing with a chamber therein that contains a fluid and a piston. The piston, which is connected to a shaft extending out of the end of the shock absorber, moves through the fluid in response to an impact force on the shaft. As the fluid in the shock absorber provides resistance to the displacement of the shaft the shock absorber effectively distributes the energy of the blow over an extended period of time as the shaft travels inward thus converting a hard impact to a softer impact.

Typically, such one-way shock absorbers are mounted on equipment to absorb impact with another object. In some cases an apparatus may need protection from shocks or forces in two opposite directions. In this case two shock absorbers are used, one to absorb the shock from the first direction and the other to absorb the shock from the opposite direction. The present invention eliminates the need for two separate shock absorbers to absorb shocks from opposite directions through a shock adapter that converts a one-way shock absorber into a two-way shock absorber.

SUMMARY OF THE INVENTION

A shock adapter for converting a one-way shock absorber into a two-way shock absorber comprises a housing having a first slideable member located on one end and a second slideable member located on the opposite end with the housing having a chamber therein for receiving and supporting a one-way shock absorber in a condition that allows movement of the housing of the one-way shock absorber in one direction when subject to a first force and the movement of a slideable member of the one-way shock absorber in an opposite direction when subject to a second force in a direction opposite to the first force.

DESCRIPTION OF THE PREFERRED EMBODIMENT

Figure 1:
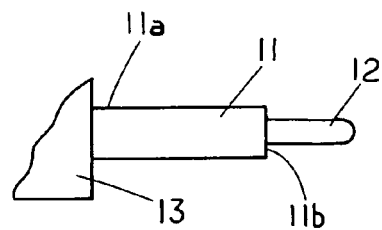
FIG. 1 is an elevation view of a prior art one-way shock absorber in a relaxed condition.

FIG. 1 shows a typical prior art one-way shock absorber 11 having one end 11a mounted on a support 13 with a slidable member 12 extending outwardly of opposite end 11b. Shock absorber 11 is in the relaxed condition or a condition wherein an impact to the slideable member 12 can be absorber by the shock absorber 11.

Figure 2:
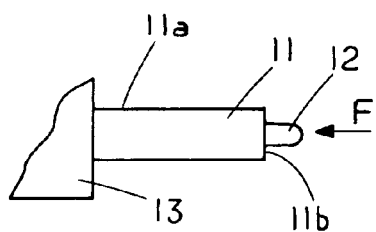
FIG. 2 is an elevation view of the prior art one-way shock absorber of FIG. 1 in a shock absorbing condition.

FIG. 2 shows the prior art one-way shock absorber 11 in the shock absorbing condition. In this condition, a force F impacts on the end of slidable member 12. In response thereto the slideable member 12 retracts into housing 11 wherein a chamber containing a fluid or the like (not shown) allows the impact energy of force F to be absorbed as the member is forcibly retracted into housing 11. Once the force F is removed the slideable member 12 returns to the condition shown in FIG. 1.

Figure 3:
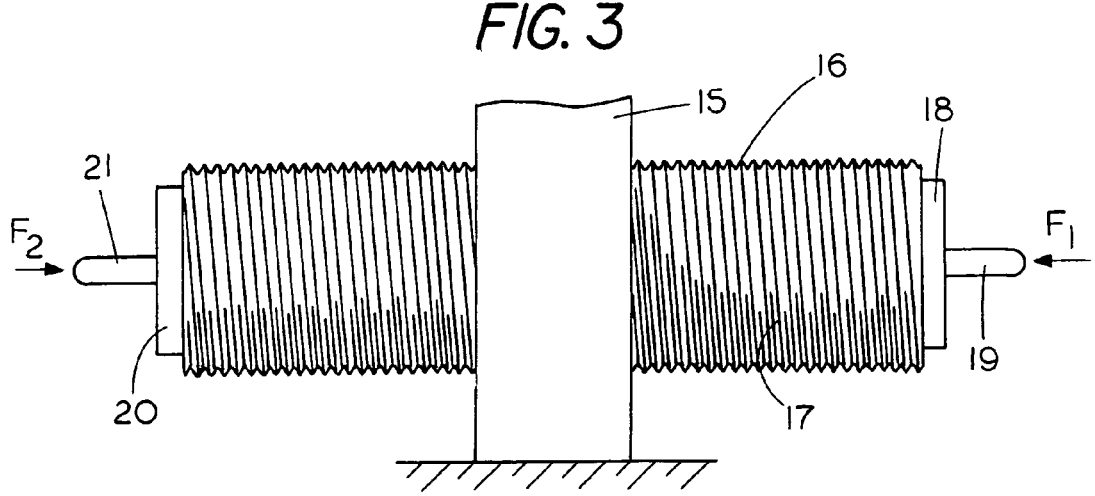
FIG. 3 is an elevation of the shock adapter of the present invention.

FIG. 3 shows the shock adapter 10 of the present invention comprises a cylindrical housing 16 having a male thread 17 thereon. The male thread 17 engages a mount 15 which includes an internal female thread to fixedly retain housing 16 therein. One end of housing includes an end cap 20 with an axially slideable member 21 extending therethrough. Similarly, the opposite end of housing 16 include a further end cap 18 with an axially slidable member 19 extending therethrough. In the condition shown, the shock adapter 10, although containing only a one-way shock absorber, can respond to impact forces from opposite directions thereby eliminating the need for two separate shock absorbers. That is, a force $F_1$ on member 19 or an opposite force $F_2$ on member 21 can be absorbed by the shock adapter 10.

Figure 4:
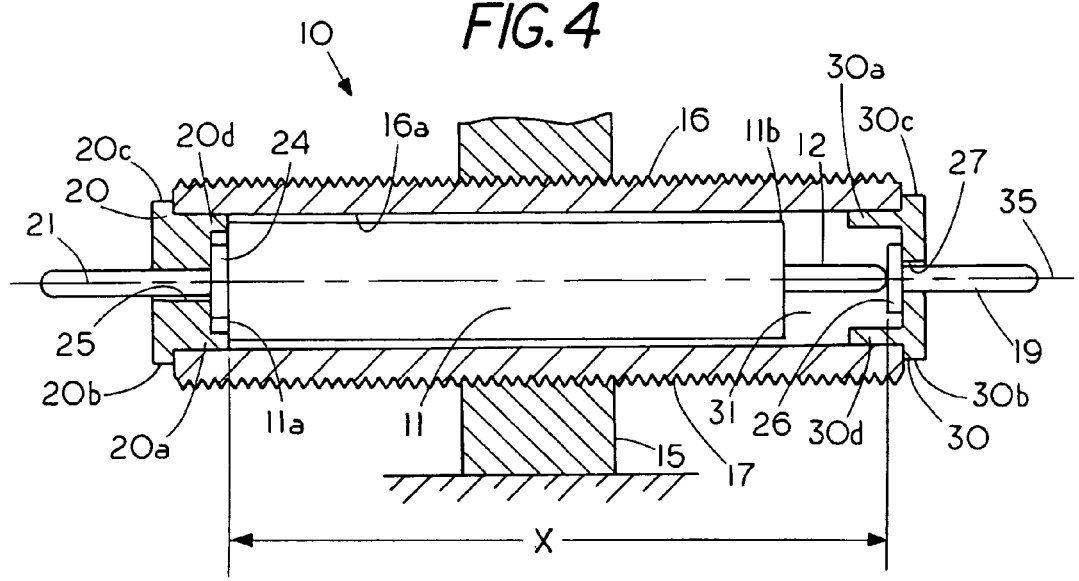
FIG. 4 is a sectional view of the shock adapter of FIG. 3 with a prior art shock absorber located in a relaxed condition therein.

In order to appreciate the operation of shock adapter 10 reference should be made to FIG. 4 which shows a cross sectional view of the shock adapter 10 with a prior art one-way shock adapter 11 contained in a cylindrical lumen or chamber 31. In the embodiment shown housing 16 includes an internal female thread 16a therein for use in threadingly engaging end caps 20 and 30 although other types of fastening such as snaps or pins could be used.

End cap 20 includes a central passage 25 to allow cylindrical slideable member 21 to slide laterally and freely therein. Member 21 includes a head or stop 24 that engages end cap 20 to maintain the slidable member 21 within housing 16. In the embodiment shown there are provided flats 20b and 20c on opposite sides of end cap 20 to provide for engagement with a wrench to allow one to secure the male threads 20d on annular member 20a to the female threads 16a. Similarly, located on the opposite end of housing 16 is a second slideable member 19 having a head or stop 26 that engages end cap 30 to limit the outward axial displacement of member 19. End cap 30 also includes a passageway 27 for member 19 to freely slide therein. Male threads 30d retain cap 30 on the end of housing 16 with end cap 30 including flats 30b and 30c to provide for engagement with a wrench to allow one to secure the threads 30d on annular member 30a to the female threads 16a.

FIG. 4 shows a sectional view of the shock adapter 10 with the lumen 31 having a length X with the length X corresponding to the length of the one-way cylinder when the one-way cylinder is in the extended condition. By having the length of the lumen equal to or slightly less than the length of the one-way chamber in the relaxed condition allows one to maintain the one-way shock absorber in an end supported and ready condition. In this condition the one-way shock absorber 11 is in a condition to receive and absorb a shock from either end of the shock adapter 10.

Figure 5:
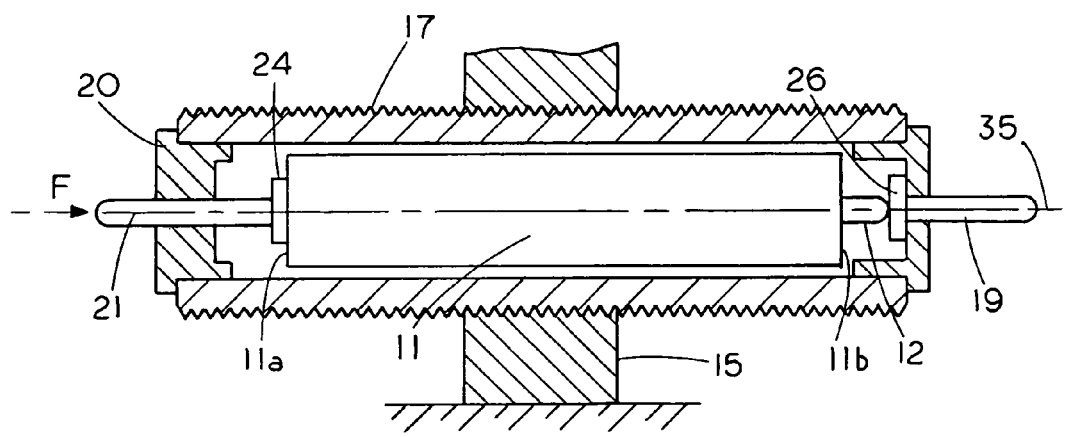
FIG. 5 is a sectional view of the shock adapter of FIG. 4 with the prior art shock adapter in a shock absorbing condition.

FIG. 5 shows the shock adapter 10 in a shock absorbing condition when a shock impacts the end of slideable member 21. In this condition the force F impacts the end of member 21 and drives the housing 11c of the one-way shock absorber 11 toward the right end of chamber 31 which causes the slidable member 12 to retract within housing 11c and absorb the shock due to force F since the slideable member 19 is retained from movement by end cap 30. Once the shock has been absorbed the housing 11c returns to the position shown in FIG. 4 and the shock adapter 10 is again in a ready condition to receive a further shock.

If a shock impacts on the end of member 19 instead of on the end of member 21 the slideable member 19 drives the slideable member 12 of the one-way shock absorber into the one-way shock absorber 11 in the same manner as illustrated in FIG. 2. Thus the shock adapter 10 of the present invention allows a prior art one-way shock absorber to deliver shock absorption in opposite directions and hence provide two-way shock absorption. That is, displacement of slideable member 12 into one-way shock absorber by either displacement of the slideable member 12 or the housing 11c also allows the one-way shock absorber 11 to provide two-way shock absorption.

The present invention includes a method of converting a one-way shock absorber into a two-way shock absorber comprising 1. forming a housing having a chamber therein sufficient large to house a one way shock absorber in a movable condition therein 2. placing a first slideable member in one end of the housing 3. placing a second slidable member in the opposite end of the housing 4. inserting a one-way shock absorber in the chamber in the housing with one end of the one-way shock absorber engaging the first slidable member and the other end of the one-way shock absorber engaging the second slideable member.

By forming the chamber in the housing with a length that is equal to or less than a length of the one-way shock absorber one can maintain the ends of the shock absorber in pressure contact with each of the slideable members so the shock absorber is in ready condition for shocks from either end and by allowing the one-way shock absorber to move axially within chamber 31 one can provide two-way shock absorption from a one-way shock absorber.

I claim:

1. A method of converting a one-way shock absorber into a two-way shock absorber comprising;
    forming a housing having a chamber therein sufficient large to house a one way shock absorber in a laterally displaceable condition therein;
    placing a first slideable member in one end of the housing;
    placing a second slidable member in the opposite end of the housing; and
    inserting a one-way shock absorber in the chamber in the housing with one end of the one-way shock absorber engageable with the first slidable member and the other end of the one-way shock absorber engageable with the second slideable member.

2. The method of claim 1 wherein the chamber in the housing is formed with a length that is equal to or less than a length of the one-way shock absorber to maintain the ends of the shock absorber in pressure contact with each of the slideable members.

* * * * *